(12) United States Patent
Downey et al.

(10) Patent No.: US 7,873,077 B2
(45) Date of Patent: *Jan. 18, 2011

(54) SYNCHRONIZING SEPARATED EDGE QAM DEVICES LOCATED REMOTELY FROM A CMTS

(75) Inventors: Denis Downey, Cork (IE); Alex Volkov, Cork (IE); Michael Harrington, Cork (IE); Frank O'Keeffe, Cork (IE); Yury Kharkunou, Cork (IE)

(73) Assignee: Arris Group, Suwanee, GA (US)

( * ) Notice: Subject to any disclaimer, the term of this patent is extended or adjusted under 35 U.S.C. 154(b) by 105 days.

This patent is subject to a terminal disclaimer.

(21) Appl. No.: 12/141,789

(22) Filed: Jun. 18, 2008

(65) Prior Publication Data

US 2008/0285597 A1 Nov. 20, 2008

Related U.S. Application Data

(63) Continuation of application No. 11/182,535, filed on Jul. 15, 2005, now Pat. No. 7,403,547.

(51) Int. Cl.
*H04J 3/06* (2006.01)
*H04N 7/16* (2006.01)

(52) U.S. Cl. .................. 370/503; 370/521; 725/144

(58) Field of Classification Search ........... 725/61–145; 370/503–512; 348/500–521, 725, 734, 825.2
See application file for complete search history.

(56) References Cited

U.S. PATENT DOCUMENTS

| 7,403,547 B2 * | 7/2008 | Downey et al. ............. 370/503 |
| 2003/0014763 A1 * | 1/2003 | Chappell et al. ............ 725/111 |
| 2003/0200548 A1 * | 10/2003 | Baran et al. .................. 725/90 |

* cited by examiner

*Primary Examiner*—Afsar M. Qureshi
(74) *Attorney, Agent, or Firm*—FSP LLC (57) ABSTRACT

The clocks of one or more edgeQAM devices are synchronized with a master clock at the remotely located CMTS. A master clock signal may be transmitted via a dedicated gigabit Ethernet link. Alternatively, master clock information contained in a time synchronization message may be transmitted for use in adjusting local oscillators that drive local clocks at respective edgeQAM devices.

4 Claims, 6 Drawing Sheets

SYNCHRONIZING SEPARATED EDGE QAM DEVICES LOCATED REMOTELY FROM A CMTS

CROSS REFERENCE TO RELATED APPLICATION

This application claims priority under 35 U.S.C. 120 as a continuation of the co-pending patent application entitled "SYNCHRONIZING SEPARATED EDGE QAM DEVICES LOCATED REMOTELY FROM A CMTS", having application Ser. No. 11/182,535 and a filing date of Jul. 15, 2005.

FIELD OF THE INVENTION

This invention relates, generally, to communication networks and devices and, more particularly, to synchronizing the clock signals for edge QAM devices located remotely from the CMTS to which they correspond.

BACKGROUND

Data-Over-Cable Service Interface Specifications ("DOCSIS") has been established by cable television network operators to facilitate transporting data traffic, primarily internet traffic, over existing community antenna television ("CATV") networks. In addition to transporting data traffic as well as television content signals over a CATV network, multiple services operators ("MSO") also use their CATV network infrastructure for carrying voice, video on demand ("VoD") and video conferencing traffic signals, among other types.

In transporting downstream multimedia content, as well as data, an upstream message, or messages, is/are typically sent to request the content and to set up a service flow to deliver the content. In addition to downstream multimedia content, such as video, voice traffic also uses message signaling to set up service flows for the upstream and downstream directions.

These signals are typically sent over a fiber network to a location, sometimes referred to as a node, near an end user, and from the node to a broadband user's device via a coaxial cable. Such an arrangement is known in the art as a hybrid fiber coaxial network ("HFC").

Conventionally, a cable modem termination system at an MSO's headend converts information to quadrature amplitude modulation ("QAM") symbols for transmission over a radio frequency channel to user devices such as cable modems. The collecting, processing and modulating of downstream signals is traditionally performed by the same physical unit at the CMTS, often the circuitry is all contained on the same silicone chip.

However, for cost and scaling reasons, it may be desirable to have traditional CMTS switching functionality separated from downstream modulation and upconverter circuitry, with the modulation circuitry communicating with the CMTS via a convenient interface, such as, for example, a gigabit Ethernet link. The upstream switching functionality is performed at the CMTS and the downstream modulation is performed at a node device, herein referred to as an EdgeQAM device that is remotely located downstream from the CMTS. Both the CMTS and the remotely located edgeQAM device typically have their own dedicated clocks. To ensure synchronicity between downstream traffic and upstream traffic when a CMTS serves multiple edgeQAM devices, especially when using synchronous code division multiple access technology in the upstream direction, there is a need in the art for a method and system for synchronizing the clock at the CMTS and the one or more edgeQAM devices that are coupled with the CMTS.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
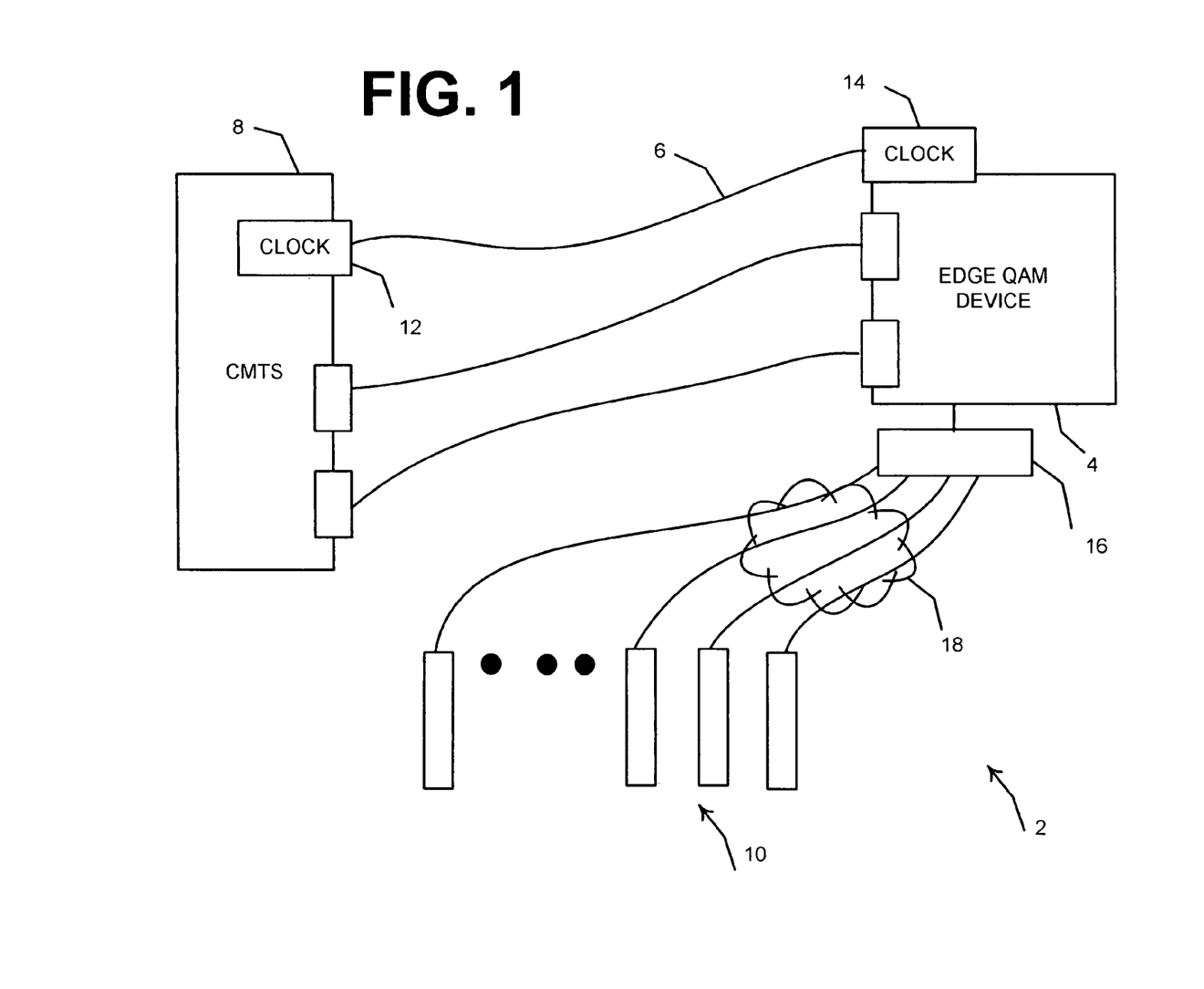
FIG. 1 illustrates a system for synchronizing a remote edgeQAM using a dedicated link.

Turning to the figures, FIG. 1 illustrates a system 2 for synchronizing a modular edgeQAM 4 using a dedicated link 6. Instead of circuitry for providing downstream quadrature amplitude modulation ("QAM") signals at the cable modem termination system ("CMTS") 8, such circuitry may be located remotely at edge QAM device 4, which is typically located at the head end, but in a separate module from the CMTS. This modular arrangement can provide flexibility, scalability and economic advantages, but there are some technical issues associated with this approach that are not present with a system where the functionality provided by the edgeQAM are handled within the CMTS.

For example, timing between the edgeQAM module(s) and CMTS must be addressed, especially when S-CDMA is used for upstream transmission. Since the downstream QAM modulation and transmission circuitry is not located at the CMTS 8, as is typical for delivering conventional cable modem data, and therefore is not driven off of the CMTS master clock 12, a local clock 14 at the edgeQAM device(s) 4 is used for operation of the edgeQAM circuitry. The edgeQAM interfaces with a transceiver 16, typically comprising a photodiode for downstream traffic and a laser for upstream traffic streams. Transceiver 16 transmits and receives traffic signals to and from end user devices 10 respectively, over hybrid fiber coaxial network 18 ("HFC").

These user devices 10 typically rely on the master clock 12 at the CMTS for operation, but local clock 14 fulfills this role in the modular CMTS arrangement. Thus, since timing of traffic flows between user devices 10 and edgeQAM 4 rely on local clock 14, and the timing of the traffic flows needs to match the timing at the CMTS, in one aspect, the master clock 12 is directly connected to local clock(s) 14 via dedicated clock link 6. Local clock link may be a twisted pair cable that transports a master clock signal, at 10.24 MHz, for example, to a clock input on edgeQAM device 4. Thus, local clock 14 and master clock 12 are synchronized within a close tolerance, and timing of traffic flows between user devices 10 and edgeQAM matches timing at CMTS module 8.

Figure 2:
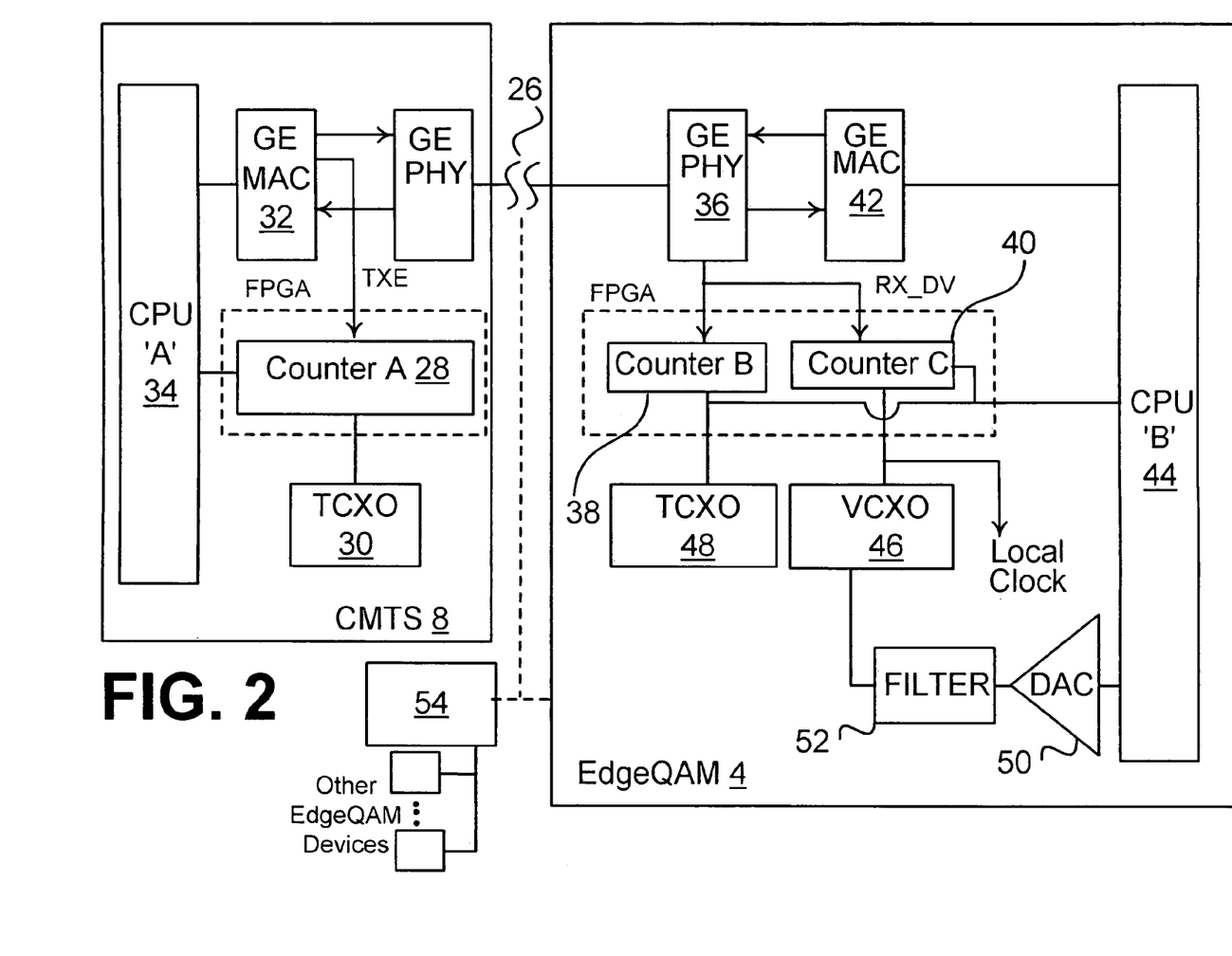
FIG. 2 illustrates a system for synchronizing a remote edgeQAM using time synchronization messages.

Turning now to FIG. 2, the dedicated link 6 as shown in FIG. 1 may be eliminated by transporting timing information between edgeQAM 4 and CMTS 8 via other means. This reduces cabling compared to the aspect described above in reference to FIG. 1, because the same gigabit ethernet link 26 that carries payload traffic between edgeQAM 4 and CMTS 8 can be used to carry timing information, thus eliminating the dedicated link 6 as shown in reference to FIG. 1. To derive the time synchronization message(s) at the CMTS 8, a system of counters, oscillators and processors may be used to generate and compare time synchronization messages sent between CMTS 8 and edgeQAM device 4. At CMTS 8, first counter 28 counts pulses of first temperature compensated crystal oscillator 30. When CMTS 8 sends a packet toward edgeQAM 4, a transmit message is sent from CMTS gigabit Ethernet MAC 32 to first counter 28 indicating that a message is being sent. For purposes of example, the transmit message may be a gigabit media-independent interface ("GMII") signal 'TXE', as known in the art, but other message types may be sent to first counter 28 indicating that a packet is being sent towards edgeQAM 4. In addition, it will be appreciated that first counter 28 may be implemented in a field programmable gate array ("FPGA"), or other means for implementing counters known in the art.

Continuing with the description of the interoperation of components at CMTS 8, when the TXE message is received by first counter 28, the contents thereof which increment at the frequency of first oscillator 30, are latched so that in essence a time stamp is generated indicating when the packet associated with the packet being sent towards edgeQAM 4 was sent. These latched contents are then sent to first processor 34 to be stored and later-sent towards edgeQAM 4. These stored contents are sent towards edgeQAM 4 as part of a time synchronization message ("TSM") in a packet other than the one that triggered the TXE. This is because the sending of the TXE-message-triggering packet occurs before the latching and storing process saves the contents of first counter 28 to first processor 34. When the TXE-message-triggering packet is received from link 26 by edgeQAM gigabit Ethernet PHY 36, the packet is also received by second counter 38 and third counter 40 at edgeQAM 4.

Since the sending of a packet from CMTS 8 triggers a TXE message, which in turn triggers the latching of the contents of first counter 28, the time synchronization message that contains the contents thereof arrives at edgeQAM 4 after the sending of the TSM that triggered the latching. However, the sending of TSM messages is set at a predetermined rate, 1000 times per second, for example, and the transmission delay over link 26 is constant. Therefore, when the contents of a given TSM are evaluated by second processor 44, as will be discussed forthwith, an offset adjustment accounting for these two factors may be taken into account.

In evaluating the contents of a TSM message, they are directly compared against the contents of third counter 40 to derive a phase error. The phase error is then used to adjust third oscillator 46, which is preferably a voltage controlled crystal oscillator, and which is referenced to temperature compensated crystal second oscillator 48. The contents of second oscillator 48 and third oscillator 46 are latched upon receipt of the TSM by PHY 36, which indicates said receipt by generating a RX_DV message and sending same to the second and third oscillators.

When the contents of second oscillator 48 and third oscillator 46 are latched upon receipt of the RX_DV message, they are sent to second processor 44. Second processor compares the contents received from the TSA message with the contents of counter 40 that were latched upon receipt of the TSA message. Thus, in essence, the contents of first counter 28 and third counter 40 are compared. The difference in the contents of first counter 28 and third counter 40 may be adjusted by the fixed lag time of transmission over Ethernet link 26 and by the period between the sending of consecutive TSM message. As discussed above, this last adjustment is made to account for the fact that the contents of first counter 28 that are contained in a TSM message correspond to the contents of the first counter that were latched and reported to first processor upon the sending of the previous TSM message. However, since TSM messages are sent at a predetermined constant rate, this is easily accounted for by second processor.

After second processor 44 has performed the comparison between the contents of first counter 28 and third counter 40 to determine a phase error value (taking into account the delay and period between TSM messages as discussed above), this phase error is used to adjust the local clock frequency produced by third oscillator 46. The phase error is applied to the contents of second oscillator 48 that were latched and reported to processor 44 upon receipt of a TSM as indicated by a RX_DV message.

When processor 44 has determined the phase error value corresponding to a given TSM message and applied it to the latched value of second counter 48 to determine a clock control value, said clock control value, typically in BCD format, is output from the processor to digital to analog converter 50. The output from digital to analog converter 50 is processed through filter 52, with the conditioned signal from the filter being used to increase or decrease the speed of third oscillator 46. Thus, the phase difference between third oscillator 46 and first oscillator 28 outputs is determined and combined with the output of second oscillator 48. This combined output signal is fed back to the input of third oscillator 46, thereby synchronizing the third oscillator's output, and thus the edgeQAM local clock frequency, with the CMTS master clock frequency output from first oscillator 30, based on the reference of second oscillator 48.

In another embodiment, where multiple edgeQAM devices are employed to reach more subscribers than in the embodiment having a single edgeQAM device 4, a gigabit Ethernet switch 54 may be located between CMTS 8 and the plurality of edgeQAM devices 4. In this aspect, propagation delay between CMTS 8 and a given edgeQAM device 4 may vary because of distance and because when a TSM message arrives from the CMTS to be forwarded to its destination edgeQAM, there may be other TSM message packets waiting to be transmitted to other edgeQAM devices. Furthermore, the distribution of propagation delay variation may not have a normal distribution.

However, some TSM message packets typically proceed through switch 4 without having to wait on other packets to be processed. Determining at a given edgeQAM 4 the time gap between a given TSM packet and the previous packet that was received from the switch can identify TSM packets that pass through with minimum delay. If the determined gap is greater than a predetermined minimum, then it is assumed that the packet was not delayed by switch 54. If it is determined that a particular TSM message packet was delayed, then it is discarded. TSM message packets that are not delayed, and thus not discarded, are processed according to the above description in reference to the embodiment having a single edgeQAM device 4.

Figure 3:
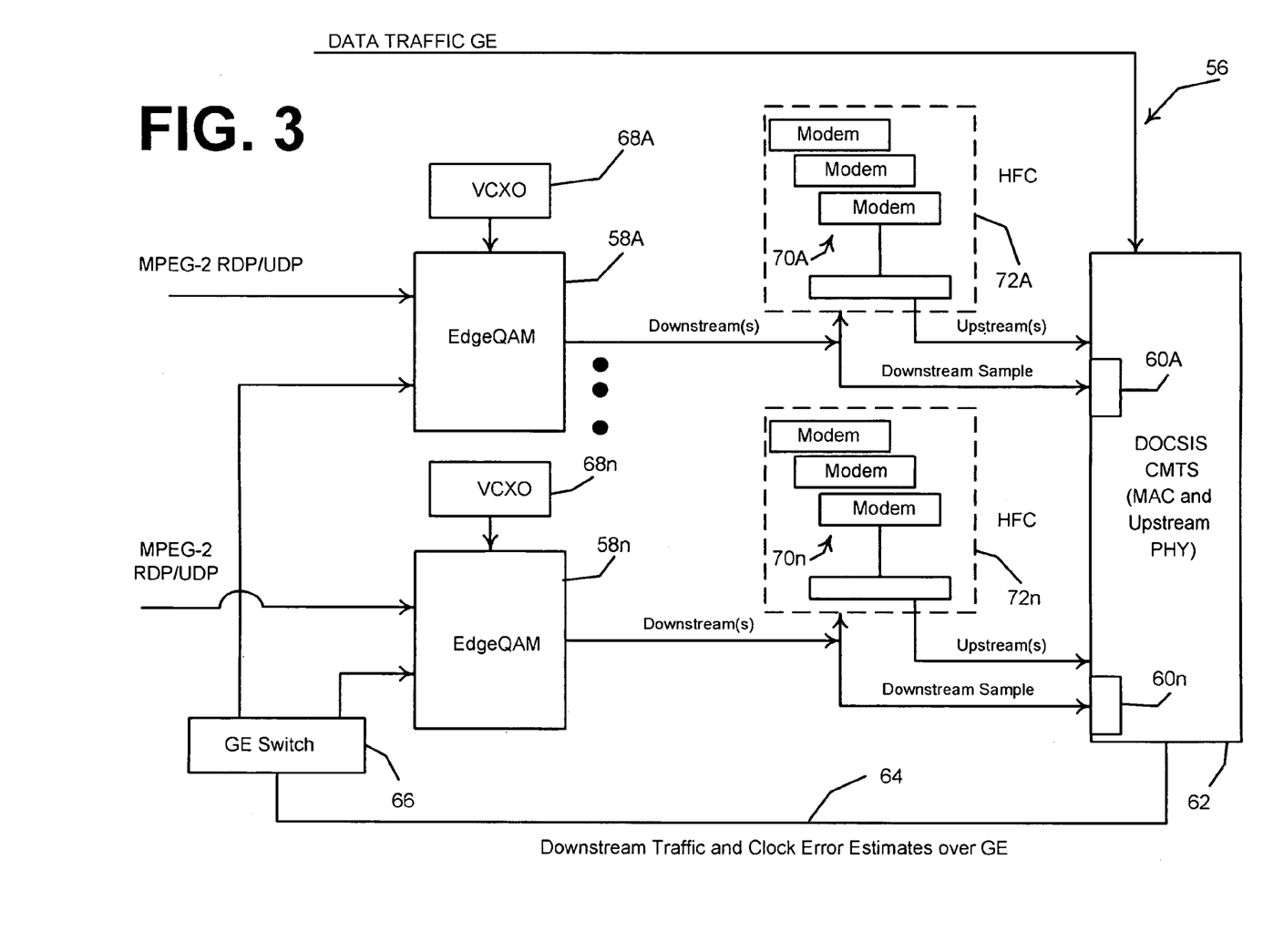
FIG. 3 illustrates a system for synchronizing a remote edgeQAM using downstream samples.

Turning now to FIG. 3, another aspect is illustrated that includes a system 56 using the downstream symbol rate from one or more edgeQAM devices 58 to indicate the local clock rate at the edgeQAM devices. A captive 'canary' modem 60 at CMTS 62 is dedicated to capture downstream traffic flows, and thus determine the local edgeQAM clock rates. A processor at CMTS 62 compares the local edgeQAM clock rates with the masterclock of the CMTS, and estimates a phase error. The phase error is then sent along gigabit Ethernet link 64 to gigabit Ethernet switch 66. Switch 66 then forwards a given phase error, contained in an Ethernet packet, to the corresponding edgeQAM device 58. Circuitry at the corresponding edgeQAM device 58 adjusts its (the edgeQAM's) local clock based on information received in the phase error packet.

Each edgeQAM 58 operates a local clock at a nominal frequency, preferably 10.24 MHZ. The edgeQAM local clocks are driven by a local voltage control crystal oscillator 68, that is regulated by circuitry components at the edgeQAM, preferably using a digital to analog converter 50 and filter 52 as shown in FIG. 2. Continuing with discussion of FIG. 3, the local clocks at the edgeQAMs 58 determine the downstream symbol rate of downstream traffic sent to modems 70 that are connected to their respective edgeQAMs over HFC networks 72. The downstream signal flow is split between HFC networks 72 and the canary modems 60. The canary modems 60 lock onto the downstream signal flows and determine the respective symbol rates thereof. These determined symbol rates are used to generate a local 'phantom' clock signal at CMTS 62. The term 'phantom' is used to signify that the phantom clock is not the actual local edgeQAM clock, but merely a representation thereof having the same frequency rate as the actual local clock at the respective edgeQAM device.

CMTS 62 determines the difference between the phantom clock signal and the CMTS master clock signal, and then generates a phase error signal based on the difference. The phase error signal is sent to switch 66 over link 64. The switch transmits the phase error signal to the appropriate edgeQAM based on standard Ethernet addressing known in the art. The phase error signal is used to regulate the frequency of the oscillator 68 at the corresponding edgeQAM. Since a given modem 70 sets its local clock according to the downstream symbol rate of the traffic streams it receives, and the modem's clock is used for the upstream burst rate of the modem, upstream and downstream traffic is thus synchronized between the modems 70, the edgeQAMs 58 and the CMTS 62.

Figure 4:
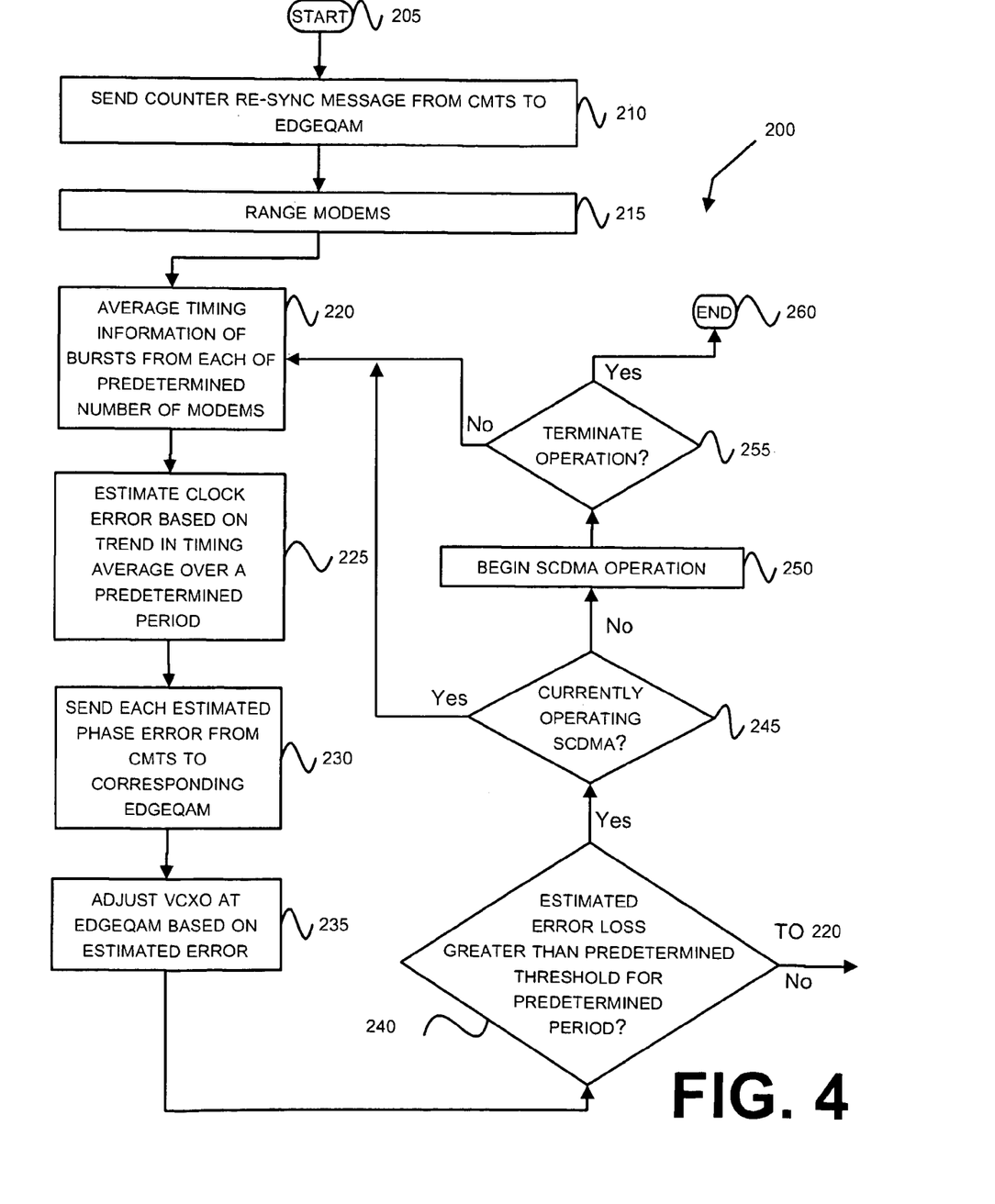
FIG. 4 illustrates a method for synchronizing a remote edgeQAM using trends of average burst timing information.

In another aspect, upstream bursts received at the CMTS are used to determine a phase error, and adjust edgeQAM local clocks based thereon. As illustrated in FIG. 4, a method 200 is shown for using upstream bursts to synchronize local clocks at edgeQAM devices with the master clock at a CMTS. After starting at step 205, a CMTS sends counter re-synchronization messages to each edgeQAM it serves at step 210. Preferably, these resynchronization messages are sent at a rate of 100 times per second. This initiates TDMA operation as known in the art.

After all modems have completed their ranging and registering process at step 215, timing information received at the CMTS from upstream bursts for a predetermined number of modems per edgeQAM are averaged at step 220. Using the average values determined at step 220 for each edgeQAM, a trend is determined over a period of time for a given edgeQAM at step 225. This trend may be thought of as an average over the predetermined period of time of the averages taken at step 220. The trends are used to derive a phase error for the edgeQAM that corresponds to the trend. Each phase error is sent to its corresponding edgeQAM at step 230. At step 235, each corresponding edgeQAM uses the phase error to adjust its local voltage controlled crystal oscillator, which is used to drive the edgeQAM's local clock.

A determination is made at step 240 whether the estimated phase error is less than a predetermined threshold. If not, process 200 returns to step 220. If so, a determination is made at step 245 whether the CMTS/edgeQAM/cable modem system is operating in S-CDMA mode. If yes, process 200 returns to step 220. If no, S-CDMA operation begins at step 250. If the system receives instruction to terminate operation, for planned reasons, such as, for example, maintenance, or for unexpected reasons, such as, for example, inclement weather causes a power outage, the process ends at step 260. If continued operation is desired, process 200 returns to step 220.

Figure 5:
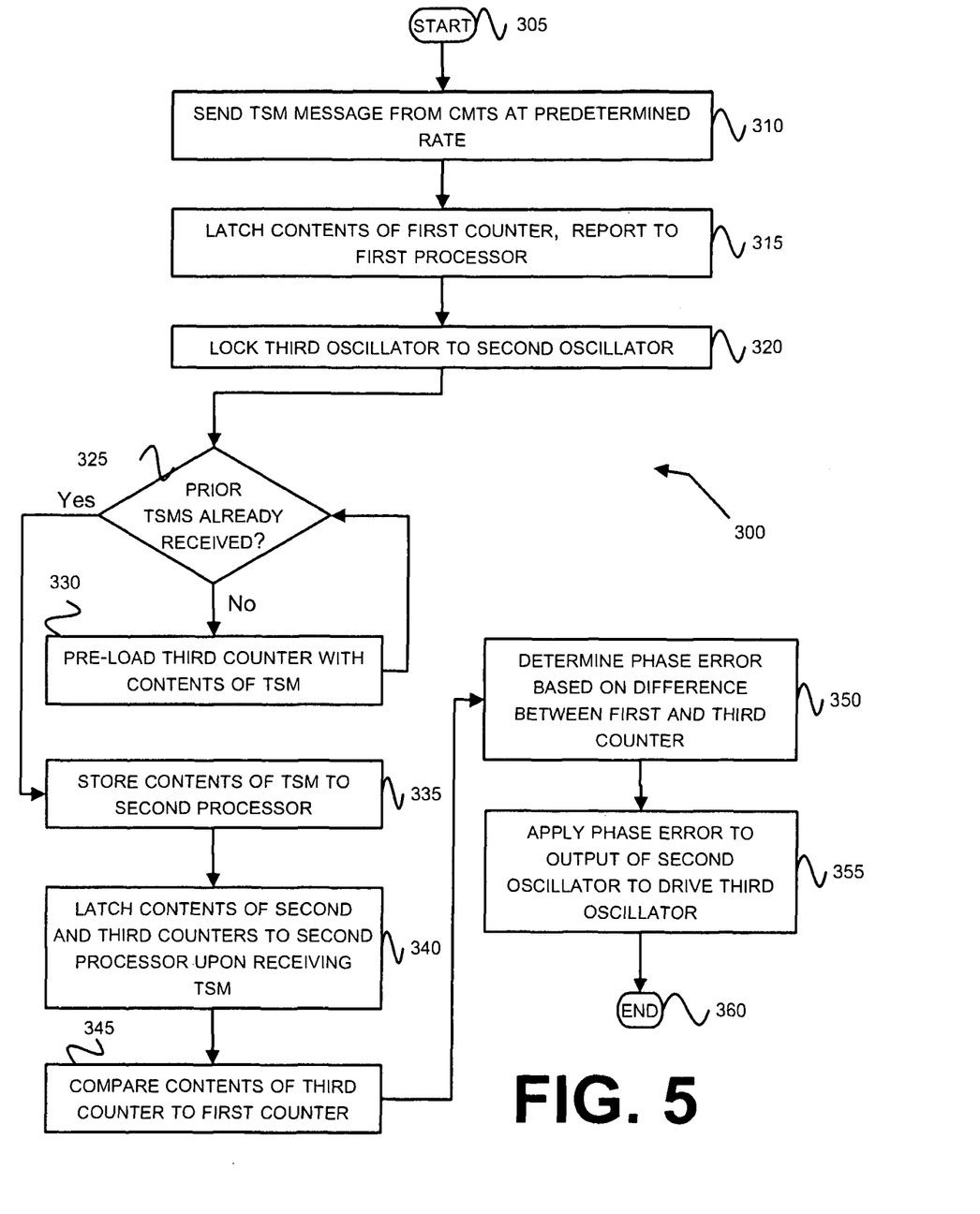
FIG. 5 illustrates a method for synchronizing a remote edgeQAM using time synchronization messages.

Turning now to FIG. 5, a process 300 is illustrated for synchronizing one or more edgeQAM devices with the master clock of the CMTS. Process 300 starts at step 305 and sends a time synchronization message to the edgeQAM(s) at step 310. The TSM messages are preferably Ethernet packets sent along an Ethernet link between the CMTS and the edgeQAM devices. When a TSM is sent from the CMTS, the contents of a first counter that drives the master clock at the CMTS are latched and reported to a first processor at the CMTS at step 315. At step 320, a third oscillator at each edgeQAM locks to a corresponding second oscillator at each edgeQAM. It will be appreciated that description of this step 320 is generally a statement of how the aspect operates, and is described for completeness. Thus, it should not necessarily be construed as a discrete step so much as an ongoing operational relationship between the second and third oscillators.

At step 325, a determination is made whether the TSM being received at the given edgeQAM is the first TSM packet received since start-up. If prior TSM packets have not been received, then process 300 moves forward and pre-loads the contents of the received TSM packet into the third counter at step 330 so that when the next TSM packet is received, there will be something to compare it with. Thereafter, the third counter contents are compared with the contents of a received TSM packet that has been stored to the second processor at step 335. This is illustrated in the figure by following the "Y" path from the box representing step 325.

When a TSM packet has been received, the contents of second and third counters are latched and reported to the second processor at step 340. At step 345, the contents relative to the third counter are compared to the contents received in the TSM, which are the contents of the first counter at the CMTS when the previous TSM was sent. As described above, this may be accounted for by programming the second processor to add an appropriate time value to the contents of a TSM based on the rate at which the CMTS sends TSM packets. By adding this value, and an appropriate value to account for the known propagation delay between the CMTS and the particular edgeQAM that is performing the evaluation to the difference between the value received in the TSM and the value latched from the third counter, the phase error is determined at step 350.

Alternatively, the contents of the third counter that were latched and reported upon receiving the previous TSM may be compared to the contents of the current TSM to determine a time difference. This difference is evaluated with a correction for propagation delay to arrive at the phase error. However calculated, this phase error is applied via a control signal at step 355 to an input to the third oscillator, which is locked to the second oscillator.

As discussed above, the third oscillator is preferably a voltage controlled crystal oscillator, which is locked to the second oscillator, which is preferably a temperature compensated oscillator similar to the first oscillator at the CMTS. The phase error is determined by the second processor, which determines a binary coded decimal ("BCD") value thereof. This BCD value is applied to the value latched from the second processor, and this composite BCD value is presented to a digital to analog converter. The output voltage of the digital to analog converter is filtered and then presented to the input of the voltage controlled oscillator (third oscillator). Thus, the third oscillator is locked to the second, and is adjusted based on the phase error with respect to the value of the first oscillator at the CMTS. The temperature compensated oscillators typically have an error of 2.5 parts per million ("ppm"). This means that when the third oscillator is perfectly synchronized with the second oscillator, it is within +/−5 ppm of the first oscillator, which is a temperature compensated crystal oscillator.

For purposes of discussion, it is assumed that propagation delay across the gigabit Ethernet link between the CMTS and the edgeQAMs is of the order of +/−20 ns. A reduction of jitter of the order of about 1,000 should achieve a desired 20 ps jitter, for example. Thus, a sample-to-loop filter ratio of 1,000,000—the square of 1,000—is selected. With a loop filter bandwidth of 0.1 Hz, a sample update frequency—the frequency at which TSM packets are sent—of 100,000 Hz is used. Thus, a packet size of 82 bytes uses 82 bytes×8 bits/byte×100,000 Hz=65.6 Mbps, which is about 6.5% of total available bandwidth.

Figure 6:
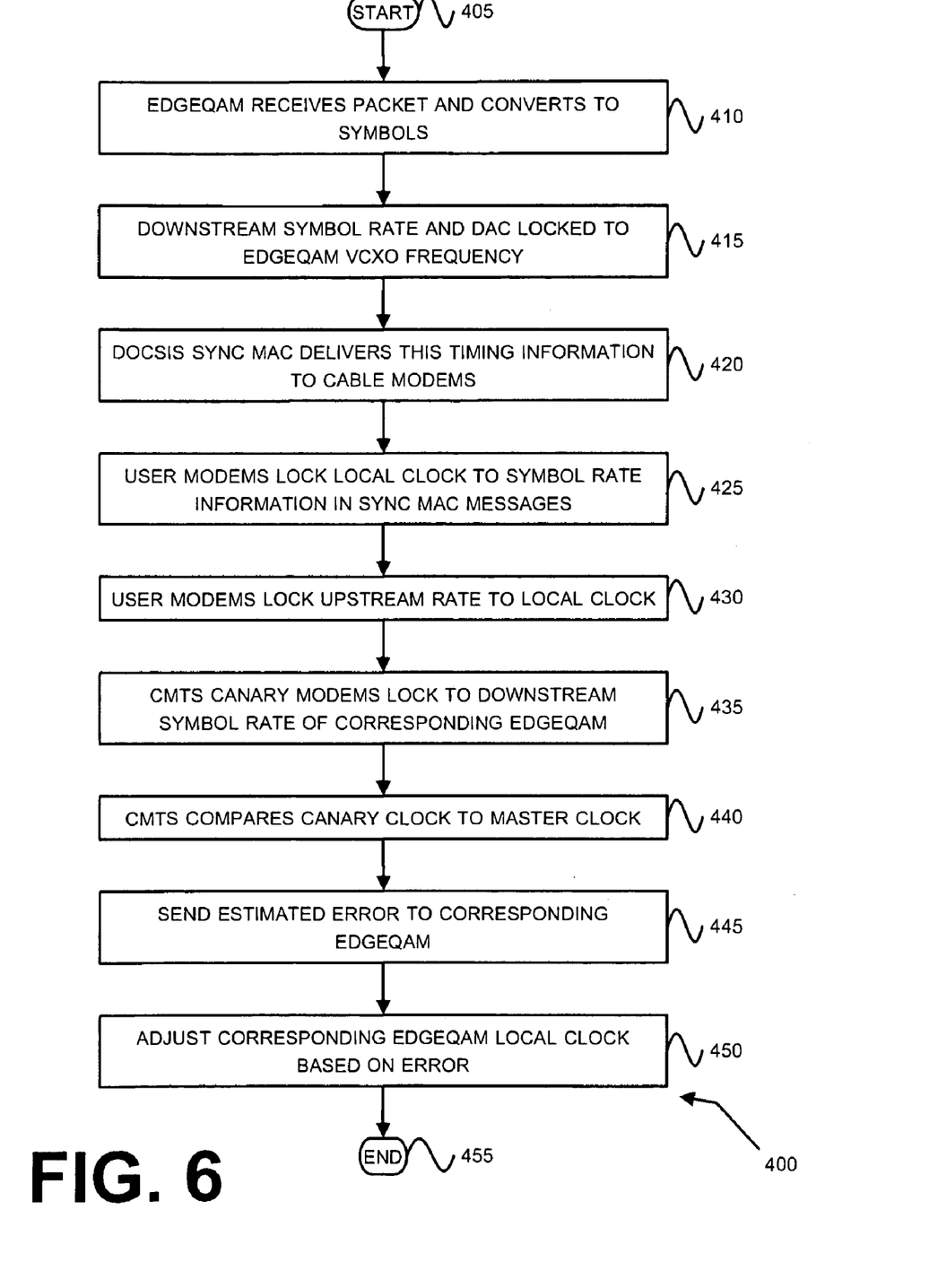
FIG. 6 illustrates a method for synchronizing a remote edgeQAM using downstream samples.

Turning now to FIG. 6, process 400 illustrates the steps for synchronizing the local clocks at one or more edgeQAM devices with the master clock of a CMTS. The process starts at step 400. An edgeQAM device receives packets from the CMTS and converts the information within them to analog quadrature-amplitude-modulation symbols at step 410 as known in the art. The rate at which downstream symbols are transmitted to the user devices, such as, for example, cable modems, is locked to a local voltage controlled crystal oscillator, as is the edgeQAM's digital to analog converter. A DOCSIS SYNC MAC message is injected at the edgeQAM device and sent on the DOCSIS channel to the modems served by the given edgeQAM device at step 415.

User devices initially lock their respective local clocks to the downstream symbol rate using information contained in the SYNC MAC message at step 425. Upstream burst rates are locked to the local device clock at step 430. At the CMTS, canary modems corresponding to the edgeQAM devices are locked to the downstream symbol rate of their respective edgeQAMs at step 435. It will be appreciated that the actions referenced in the description of some of these steps (as well as steps of other processes described in this application) may occur simultaneously, and are depicted in the order that they are for purposes of clarity, but could properly be ordered differently.

At step 440, the CMTS compares the canary clocks to the master clock, and send an estimated error value to the respective edgeQAM devices corresponding thereto at step 445. The edgeQAM devices adjust their respective clocks based on the received error value at step 450, and the process ends at step 455. It will be appreciated that process 400 repeats periodically, with the exception that the SYNC MAC message may not need to be sent with every iteration, as the error value is used to adjust the local clocks of the edgeQAM devices after the initial iteration following a range and register operation.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. An edge quadrature amplitude modulator (edgeQAM) comprising:
    a first counter driven by a temperature controlled oscillator;
    a second counter driven by a voltage controlled oscillator;
    at least one processor;
    a local clock; and
    the edgeQAM adapted to latch values of the first and second counters in response to receiving a time synchronization message from an external device, and to output the latched counter values to the at least one processor, and to compare a value of the second counter with the received time synchronization message to generate a phase error difference, and to adjust a frequency of the second counter according to the phase error difference, and applying the frequency of the second counter to the local clock.

2. A cable modem termination system (CMTS) comprising:
    at least one processor; and
    the CMTS adapted to operate the at least one processor to receive timing information from a plurality of cable modems each served by an edgeQAM; to average the collected timing information over a predetermined time interval; to estimate a clock error for the edgeQAM from the average timing information; and to communicate the estimated clock error to the edgeQAM.

3. The CMTS of claim 2, further comprising:
    a counter; and
    the CMTS adapted to operate the at least one processor to latch a value of the counter in response to communicating a time synchronization message to the edgeQAM.

4. A cable modem termination system (CMTS) comprising:
    at least one processor;
    a canary clock corresponding to an edgeQAM;
    a master clock; and
    the CMTS adapted to operate the at least one processor to lock the canary clock to a downstream traffic stream of the corresponding edgeQAM; to estimate a phase error between the canary clock and the master clock; and to communicate the phase error to the edgeQAM.

* * * * *